United States Patent
Dudis et al.

(10) Patent No.: US 9,863,725 B1
(45) Date of Patent: Jan. 9, 2018

(54) SYSTEMS AND METHODS FOR THERMAL MANAGEMENT THROUGH USE OF AMMONIUM CARBAMATE

(71) Applicant: The United States of America, as represented by the Secretary of the Air Force, Washington, DC (US)

(72) Inventors: Douglas S. Dudis, Tipp City, OH (US); Joel E. Schmidt, Pasadena, CA (US); Douglas J. Miller, Cedarville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1189 days.

(21) Appl. No.: 13/778,675

(22) Filed: Feb. 27, 2013

Related U.S. Application Data (60) Provisional application No. 61/604,691, filed on Feb. 29, 2012.

(51) Int. Cl.
 *F28F 23/00* (2006.01)
(52) U.S. Cl.
 CPC .................... *F28F 23/00* (2013.01)
(58) Field of Classification Search
 CPC .. F28F 23/00; F17C 2223/0184; Y02E 60/14; Y02E 60/142; Y02E 60/145; Y02E 60/147; F28D 20/0034; F28D 20/0056; F01N 2610/02; F01N 2610/01; F01N 3/208
 USPC ................ 502/56; 422/109; 165/10, 104.12, 165/104.32, 104.17
 See application file for complete search history.

(56) References Cited

U.S. PATENT DOCUMENTS

| 1,661,104 A | 2/1928 | Barnebey |
| 2,002,681 A | 5/1935 | Theodor et al. |
| 2,194,082 A | 3/1940 | Booth |
| 2,925,722 A | 2/1960 | Blackburn et al. |

(Continued)

FOREIGN PATENT DOCUMENTS

| EP | 0666214 | 11/2002 |
| EP | 2392785 A1 | 12/2011 |

(Continued)

OTHER PUBLICATIONS

Koutinas, A.A., et al., "Industrial Scale Modelling of the Thermochemical Energy Storage System Based on CO2 +2NH3 <—> NH2COONH4 Equilibrium," Energy Conversion and Management, vol. 23, Issue 1, pp. 55-63 (1983).

(Continued)

*Primary Examiner* — Carlos A Rivera
*Assistant Examiner* — Marcos O Diaz
(74) *Attorney, Agent, or Firm* — AFMCLO/JAZ; Timothy Barlow (57) ABSTRACT

Ammonium carbamate-based methods and systems for management of thermal loads, particularly low-quality, high-flux thermal loads. The increase in temperature in heat sensitive devices is mitigated by the endothermic decomposition of ammonium carbamate into carbon dioxide and ammonia gases. This process has an energy density an order of magnitude greater than conventional thermal management materials and is particularly useful for temperatures between 20° C. and 100° C. Systems incorporating ammonium carbamate may be controlled by regulating the fluid flow, overhead pressure, temperature, or combinations thereof.

14 Claims, 8 Drawing Sheets

(56) References Cited

U.S. PATENT DOCUMENTS

| | | | |
|---|---|---|---|
| 3,067,594 A | 12/1962 | Bland et al. | |
| 3,137,725 A | 6/1964 | Cook et al. | |
| 3,255,246 A | 6/1966 | Singer | |
| 3,485,666 A | 12/1969 | Sterling et al. | |
| 3,697,519 A | 10/1972 | Kasenbrood | |
| 3,697,521 A | 10/1972 | Van Nassau et al. | |
| 3,886,210 A | 5/1975 | Mavrovic | |
| 3,944,605 A | 3/1976 | Inoue et al. | |
| 4,043,881 A | 8/1977 | Yen et al. | |
| 4,053,507 A | 10/1977 | Inoue et al. | |
| 4,088,684 A | 5/1978 | Mavrovic | |
| 4,094,903 A | 6/1978 | Mavrovic | |
| 4,169,499 A | 10/1979 | Lefrois | |
| 4,223,140 A | 9/1980 | Hirdler et al. | |
| 4,360,671 A * | 11/1982 | Wojtowicz | C07D 251/36 544/192 |
| 4,567,294 A | 1/1986 | Dressel et al. | |
| 5,007,478 A | 4/1991 | Sengupta | |
| 5,198,310 A | 3/1993 | Fleming et al. | |
| 5,857,324 A * | 1/1999 | Scappatura | B01D 53/922 60/274 |
| 5,974,072 A | 10/1999 | Hartlove et al. | |
| 6,235,216 B1 | 5/2001 | Hayes | |
| 6,266,955 B1 | 7/2001 | Liang et al. | |
| 6,361,754 B1 | 3/2002 | Peter-Hoblyn et al. | |
| 6,511,644 B1 | 1/2003 | MacArthur et al. | |
| 6,875,407 B1 | 4/2005 | Biel et al. | |
| 7,533,522 B2 * | 5/2009 | Klein | B01D 53/90 60/274 |
| 7,955,568 B2 | 6/2011 | Ulmann et al. | |
| 8,016,022 B2 | 9/2011 | Richason et al. | |
| 8,273,474 B2 | 9/2012 | Al-hallaj et al. | |
| 8,361,422 B2 | 1/2013 | Soukhojak et al. | |
| 2002/0056273 A1 * | 5/2002 | Itoh | B01D 53/90 60/286 |
| 2003/0234011 A1 | 12/2003 | Breuer et al. | |
| 2008/0121375 A1 * | 5/2008 | Richason | F28D 20/028 165/96 |
| 2008/0202473 A1 * | 8/2008 | Cook | F01N 3/2066 123/478 |
| 2008/0260597 A1 * | 10/2008 | Suzuki | B01B 1/005 422/148 |
| 2009/0004556 A1 * | 1/2009 | Al-Hallaj | H01M 10/4207 429/120 |
| 2010/0242928 A1 * | 9/2010 | Fasold | B01D 53/40 123/568.12 |
| 2010/0293927 A1 * | 11/2010 | Johannessen | B01D 53/79 60/295 |
| 2011/0083827 A1 * | 4/2011 | Salyer | F24F 5/0021 165/104.14 |
| 2012/0045378 A1 * | 2/2012 | Soukhojak | B01B 1/005 423/212 |
| 2012/0067055 A1 | 3/2012 | Held | |

FOREIGN PATENT DOCUMENTS

| | | |
|---|---|---|
| JP | 54058248 | 5/1979 |
| WO | PCTSE8500340 | 3/1986 |

OTHER PUBLICATIONS

Fulks, G., et al., "A Review of Solid Materials as Alternative Ammonia Sources for Lean NOx Reduction with SCR," SAE Technical Paper 2009-01-0907, 2009, doi:10.4271/2009-01-0907.

Dunn, R., et al., "A Review of Ammonia-Based Thermochemical Energy Storage for Concentrating Solar Power," Proceedings of the IEEE, vol. 100, Issue 2, pp. 391-400 (2012).

Park, Chanwoo, et al., "Advanced hybrid cooling loop technology for high performance thermal management," 4th International Energy Conversion Engineering Conference, Jun. 26-29, 2006, San Diego, California.

Briggs, T.R., et al., "The Ammonium Carbamate Equilibrium," J. Phys. Chem. (1924) 28 (11), pp. 1121-1135.

Egan, E.P., et al., "Dissociation Pressure of Ammonium Carbamate," Ind. Eng. Chem. (1946), 38, pp. 454-456.

Claudel B., et al., "A New Model of Gas-Solid Kinetics: The Case of Ammonium Carbamate Formation and Decomposition," Thermochimica Acta, 126 (1988) pp. 129-148.

Ramachandran, B.R., et al., "Kinetics and Mechanism of the Reversible Dissociation of Ammonium Carbamate: Involvement of Carbamic Acid," J. Phys. Chem. A 1998, 102, pp. 3934-3941.

NASA, "Preferred Reliability Practices, Practice No. PD-ED-1209, Ammonia-Charged Aluminum Heat Pipes with Extruded Wicks," available at [http://engineer.jpl.nasa.gov/practices/1209.pdf].

Non-final Office Action dated Jan. 21, 2016 in U.S. Appl. No. 13/778,685, 21 pages.

Non-final Office Action dated Sep. 7, 2016 in U.S. Appl. No. 13/778,685, 38 pages.

* cited by examiner

SYSTEMS AND METHODS FOR THERMAL MANAGEMENT THROUGH USE OF AMMONIUM CARBAMATE

CROSS-REFERENCE TO RELATED APPLICATIONS

This application claims the benefit of U.S. Provisional Application No. 61/604,691, filed on Feb. 29, 2012, by inventor Douglas Dudis, et al. and entitled "Use of Ammonium Carbamate as a High Energy Density Heat Storage Material," which is herein incorporated by reference in its entirety.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates generally to the field of thermal management. More particularly, it relates to ammonium carbamate-based thermal management systems and methods for managing thermal loads.

2. Description of the Related Art

Thermal management of heat in the temperature range of 20-100° C. is a problem encountered in a variety of situations and is particularly problematic for high-flux heat and in volume- and weight-constrained environments. Conventional methods of thermal management such as heat rejection, heat conversion, and heat storage are generally insufficient to manage this low-grade or low quality and/or high-flux heat. High quality heat is generally understood to mean that the operational temperature of the entity requiring cooling is significantly higher than the temperature of the heat sink to which the thermal energy is transferred. In contrast, low quality heat occurs when the fluid or object requiring cooling is close in temperature to the heat sink. Low-grade waste heat generated from machinery, electrical equipment, and electronic devices presents a significant problem as most equipment and electronics must operate in a temperature range of about 20-100° C.

Heat rejection transfers or "rejects" excess thermal energy to the environment via radiation, thermal convection (gaseous or liquid cooling fluids), or thermal conduction through a solid medium. Heat conversion captures waste heat and recovers some of the energy by, for example, heating water for use in a steam engine to generate electrical power. Both of these methods generally work best with a large temperature difference, so thermal management of low quality heat using heat rejection and/or heat conversion is often poor because the waste heat is only slightly above the heat rejection temperature.

Thermal storage is a means of thermal management in which heat is absorbed into a storage medium for later reuse or eventual rejection to the environment. Two classes of thermal storage materials are common in practice: those based on latent heats and those based on sensible heats. Latent heats are those associated with phase changes, such as the enthalpy (heat) of melting of a paraffin wax, while sensible heats are associated with temperature increases, such as heat stored in water as the water temperature is raised. To compensate for the low rate of heat transfer encountered with low quality heat, the surface area of interaction may be increased, the quantity of coolant fluid may be dramatically increased, and/or heat spreaders such as metal matrices may be employed. For terrestrial applications in which land is readily available, these constraints generally do not pose insurmountable problems. However, in volume- and/or weight-constrained environments, these compensations are frequently insufficient, and the increasingly complex systems are often impossible to implement.

Furthermore, many latent heat-based thermal management materials introduce additional complications when implemented. For instance, lithium hydroxide stores a significant quantity of thermal energy upon melting, which makes it a good thermal storage medium. However, the resulting liquid can be difficult to constrain, and the reverse process can require an unacceptably large amount of time, limiting the overall system availability and duty cycles. Likewise, paraffin wax-based systems are limited by the slow crystallization rate of the liquid wax. Application of many thermal management systems is further limited due to their dependence on gravitational forces. Many phase change materials lose contact with heat spreaders upon melting under certain gravitational conditions. This loss of thermal contact due to liquefaction frequently renders the waxes ineffective for thermal management.

Thermal management systems based on chemical reactions are currently being explored. Metal hydride-based systems such as $Mg/MgH_2$ and $LiAlH_4$ have high gravimetric thermal energy densities and produce large amount of hydrogen that can be stored or used in other processes. However, these systems share a number of drawbacks that make their use impractical in many environments. Hydrogen is extremely flammable, and most metal hydrides react violently with water, both of which present significant safety hazards. In addition, metal hydride-based systems are problematic in that the reaction kinetics are often slow, with poor reversibility, and they have a high desorption temperature.

Current systems employing ammoniates likewise suffer from numerous drawbacks that often make their use impractical or impossible in some environments. Some systems combine ammonia gas and a salt such as NaCl or KCl to form a complex, which then endothermically disassociates. However, formation of the ammonia-salt complex requires high pressures and large amounts of salt. Other ammonia-based systems simply take advantage of the phase change of ammonia from a liquid to a vapor and either eject the ammonia gas into the environment or circulate the ammonia gas through large radiators to reject the heat. For example, COIL (Chemical Iodine Oxygen Lasers) lasers are generally cooled by flash evaporation of liquid ammonia, whereas ammonia-based heat pipes are utilized for thermal management on spacecraft. The liquid ammonia used in these systems is toxic and must be carefully handled and stored, particularly in enclosed or confined spaces such as aircraft and spacecraft. Tank leakage or spillage of the ammonia can quickly result in lethal concentrations of corrosive ammonia gas.

SUMMARY OF THE INVENTION

The presently disclosed invention includes thermal management systems and methods utilizing ammonium carbamate for efficient management of thermal loads. Formation of ammonium carbamate is exothermic, while its decomposition into ammonia and carbon dioxide is highly endothermic, making ammonium carbamate an ideal thermal energy storage or rejection material to manage heat under a variety of conditions. The presently disclosed invention is particularly useful for management of low quality and/or high flux heat loads, including thermal loads in the 20-100° C. temperature range. In addition, the presently disclosed invention is useful for management of heat in volume- and weight-constrained environments.

In one embodiment, an ammonium carbamate-based thermal management system according to the present invention comprises a flow controller comprising a control unit, a fluid circulator, a flow valve, and at least one temperature sensor, with the fluid circulator being coupled to a thermal load and the flow controller being configured to regulate a flow of coolant fluid from the thermal load; a primary heat exchanger that is coupled to the flow controller, with the primary heat exchanger comprising ammonium carbamate and being configured to transfer heat from the coolant fluid to the ammonium carbamate, which endothermically decomposes into ammonia gas and carbon dioxide gas upon the transfer of heat from the coolant fluid; a vacuum source that is coupled to the primary heat exchanger; and a pressure controller coupled to the primary heat exchanger and to the vacuum source. The pressure controller is configured to control the vacuum source to remove the ammonia gas and the carbon dioxide gas from the primary heat exchanger, thereby regulating an overhead pressure within the ammonium carbamate-based thermal management system.

In one embodiment of the ammonium carbamate-based thermal management system, the vacuum source is a vacuum pump. In another embodiment, the vacuum source is a pressure differential between an overhead pressure inside the ammonium carbamate-based thermal management system and an exterior atmospheric pressure for use in conditions of low atmospheric pressure.

In an alternative embodiment, the ammonium carbamate-based thermal management system further comprises at least one heating element that is configured to prevent the ammonia gas and the carbon dioxide gas from combining to reform ammonium carbamate prior to removal from the ammonium carbamate-based thermal management system.

In a further embodiment, the ammonium carbamate-based thermal management system comprises a storage chamber. In one embodiment, the storage chamber further comprises a reservoir liquid in which the ammonia gas and/or the carbon dioxide gas are soluble.

In another embodiment, the ammonium carbamate-based thermal management system further comprises a redirection component that is configured to direct at least one of the ammonia gas and the carbon dioxide gas from the vacuum source to at least one secondary application.

In an alternative embodiment, the ammonium carbamate-based thermal management system further comprises a secondary heat exchanger coupled to the vacuum source, in which the secondary heat exchanger is configured to exothermically combine the ammonia gas and the carbon dioxide gas to form regenerated ammonium carbamate. The regenerated ammonium carbamate is then transferred back into the primary heat exchanger for reuse.

In an alternative embodiment, the primary heat exchanger further comprises a heat transfer fluid in which the ammonium carbamate is suspended or dissolved and a circulation mechanism. In one embodiment, the heat transfer fluid comprises a non-solvent heat transfer fluid in which the ammonium carbamate forms a suspension. In an alternative embodiment, the heat transfer fluid comprises a heat transfer solvent in which the ammonium carbamate forms a solution.

In one embodiment of the ammonium carbamate-based thermal management system in which the primary heat exchanger comprises a heat transfer fluid, the primary heat exchanger further comprises a plurality of coils that are configured such that the coolant fluid flows through the coils, with an exterior surface of the coils being in contact with the heat transfer fluid. In a further embodiment, the primary heat exchanger comprises a plurality of thermally conductive structures that are configured such that heat from the coolant fluid is transferred to the thermally conductive structures, with an exterior surface of the thermally conductive structures being in contact with the heat transfer fluid.

DETAILED DESCRIPTION

The present invention includes thermal management systems and methods utilizing ammonium carbamate for management of low quality heat. Ammonium carbamate, which may be written either as $NH_2COONH_4$ or $[NH_4][NH_2CO_2]$, is formed by the following reversible reaction: $CO_2 + 2NH_3 \leftrightarrow NH_2COONH_4$. Formation of ammonium carbamate is exothermic, while its decomposition into ammonia and carbon dioxide is endothermic. When a thermal load is applied to the ammonium carbamate, it spontaneously decomposes into its constituent gases (ammonia and carbon dioxide) and absorbs large quantities of heat in the process. This process allows its use as a thermal energy storage or rejection material to manage high and low quality heat under low, high, or intermittent heat flux conditions.

The heat of decomposition of ammonium carbamate provides a gravimetric thermal energy density an order of magnitude (about 10 times) greater than many conventional thermal management materials. For example, common phase change thermal management materials such as paraffin waxes and ice slurries possess energy densities of only a few hundred kilojoules/kilogram (approximately 200-300 kJ/kg), while ammonium carbamate possesses a decomposition energy of about 2,000 kJ/kg. Enhancement of heat transfer to the ammonium carbamate may be achieved using thermally conductive foams, fins, plates, pipes, and other structures and/or heat transfer fluids (solvent and non-solvent). The rate and amount of heat absorption may be further modified by controlling temperature, fluid flow rate, and/or overhead pressure control.

Two advantages of the present invention are its high gravimetric and volumetric energy densities, which makes it especially useful for thermal management in environments in which volume and weight constraints are paramount. Examples include, but are not limited to, aircraft, spacecraft, unmanned aerial vehicles, and remote locations, especially those lacking adequate cooling water. In addition, the present invention offers the potential for safe, long term storage with high reliability for heat load management that is on-demand, low maintenance, and economical. Ammonium carbamate or slurries thereof tolerate storage well, provided that they are sealed and prolonged temperatures above 30° C. are avoided. Ammonium carbamate is also commercially available and safely managed in large industrial quantities in its role as an intermediate in the production of urea.

An additional advantage of an ammonium carbamate system, especially when utilized with heat transfer solvents, is the insensitivity of the system to gravitational forces. With paraffin waxes and similar materials, the contact between the heat exchanger fins and the wax may be broken if the system is tilted or inverted. Loss of contact results in loss of thermal management and possible thermal overload of the system requiring cooling. By contrast, a system according to the present invention may be readily implemented in a manner that is independent of gravitational forces.

The present invention may have numerous commercial applications, including but not limited to, on-demand heat rejection, thermal energy storage, and cooling. In addition, the ammonium carbamate thermal management function may further be leveraged to provide a source of ammonia for a variety of applications. As non-limiting examples, the ammonia from the decomposition of ammonium carbamate may be used as an ammonia source for a variety of applications including an ammonia-powered engine or an ammonia fuel cell, as well as reduction of $NO_x$ gases produced by combustion and industrial processes. In an ammonia source application, ammonium carbamate is an attractive alternative to liquid ammonia because it does not require high pressure storage systems, nor does it present the health hazards that liquid or gaseous ammonia present upon accidental release.

Referring now to the drawings, like reference numerals may designate like or corresponding parts throughout the several views. Where noted, portions of the thermal management system and labeling of some components have been omitted for clarity and to illustrate certain aspects of the invention in detail. These variations should in no way be interpreted as limiting the scope of the invention.

Figure 1:
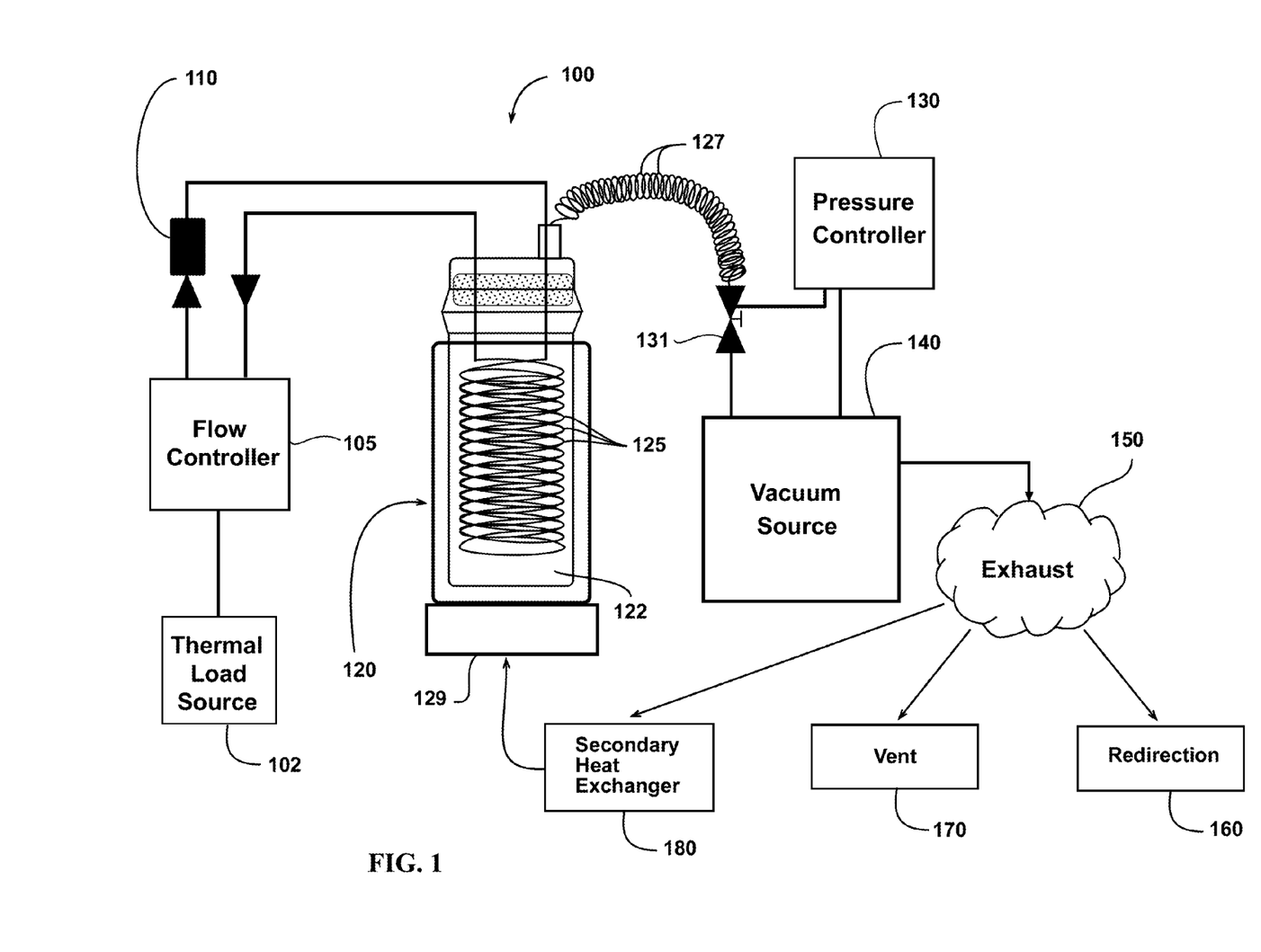
FIG. 1 is a side view of an exemplary embodiment of an ammonium carbamate-based thermal management system.

FIG. 1 is an exemplary embodiment of a thermal management system 100 according to the present invention. The thermal management system 100 comprises a flow controller 105 that is coupled to an ammonium carbamate heat exchanger 120. The flow controller 105 is coupled to a thermal load source 102, which may comprise, for example, a coolant fluid or liquid that has absorbed heat from a device or exothermic process. The coolant fluid may comprise, for example, water, glycol, an alcohol, a high boiling point hydrocarbon, or other commonly used heat transfer fluids known to those skilled in the art. The flow controller 105 may comprise a fluid circulator such as a circulation pump (not separately labeled) that draws the coolant fluid into the flow controller. The flow controller 105 may further comprise a control unit 110, which may comprise a variety of components and sensors, including, but not limited to, one or more temperature sensors that monitor the temperature of the thermal load 102 and the coolant fluid temperature at the inlet and outlet of flow controller 105, as well as one or more sensors that monitor the coolant fluid flow rate and vapor pressure at one or more positions within the thermal management system 100 such as above the coil. The flow controller 105 may further comprise a valve that regulates a flow of coolant fluid from the flow controller 105 into the ammonium carbamate (primary) heat exchanger 120.

The ammonium carbamate exchanger 120 is configured to transfer heat from the coolant fluid to the ammonium carbamate 122. In the embodiment depicted in FIG. 1, the ammonium carbamate exchanger 120 comprises a chamber in which the ammonium carbamate 122 surrounds a plurality of coils 125 through which the coolant fluid from the flow controller 105 is circulated. Heat from the coolant fluid is transferred through the coils 125 directly to the ammonium carbamate 122. Because the thermal conductivity of pure ammonium carbamate 122 is too low for many applications (approximately 0.531 W/m*K at 12.9° C.), additional configurations and components may be employed to increase the amount of heat transfer. In alternative embodiments, the ammonium carbamate heat exchanger 120 may comprise foams, fins, plates, pipes, and/or other suitable thermally conductive structures known to a person of ordinary skill in the art. These thermally conductive structures may comprise a thermally conductive metal such as carbon, aluminum, or another suitable metal or combination, alloy, or composite thereof. Heat from the coolant fluid is transferred to the thermally conductive structures, which in turn transfer the heat to the ammonium carbamate 122. In all embodiments, the transfer of heat from the thermal load 102 to the ammonium carbamate 122 causes the ammonium carbamate 122 to endothermically decompose into ammonia gas and carbon dioxide gas.

To further increase the amount and rate of heat transfer from the thermal load 102, the ammonium carbamate heat exchanger 120 may comprise a non-aqueous heat transfer fluid. As used throughout, "non-aqueous" refers to a liquid or solution that contains no water. Water-based conventional thermal management systems that generally operate at high temperature and pressure are unsuitable for low quality heat thermal management and would present difficulties with ammonium carbamate as urea is known to be produced as an unwanted and potentially toxic byproduct under such conditions. The absence of water and the low temperature of operation (at or under 100° C.) in the present invention are expected to preclude the formation of urea. The use of heat transfer fluids with high boiling points and low volatilities is especially advantageous as these minimize or eliminate evaporative fluid loss.

In one embodiment, the ammonium carbamate 122 is maintained within the ammonium carbamate heat exchanger 120 such that it is physically isolated from the heat transfer fluid. For example, in the embodiment depicted in FIG. 1, the heat transfer fluid would be in contact with the coils 125, and the heat transferred from the coolant fluid would be transferred to the heat transfer fluid. In alternative embodiments comprising foams, fins, and/or other thermally conductive structures, heat would be transferred from the coolant fluid to the thermally conductive structures, followed by heat transfer to the heat transfer fluid circulating around the thermally conductive structures. In all embodiments, heat would then be transferred from the heat transfer fluid to the ammonium carbamate 122, causing it to endothermically decompose.

In further embodiments, the ammonium carbamate 122 may be dissolved and/or suspended in the heat transfer fluid, which further increases the transfer of heat from the thermal load 102 to the ammonium carbamate 122. In one embodiment, the heat transfer fluid may comprise a non-solvent heat transfer fluid in which the ammonium carbamate 122 is insoluble. Because ammonium carbamate 122 is an ionic solid, it has little or no solubility in non-polar liquids or liquids with low polarity and forms a suspension in these non-solvent heat transfer fluids. Examples of non-solvent heat transfer fluids may include, but are not limited to, xylene, triglyme, tetraglyme, high boiling petroleum products, and/or any other suitable liquid or combination thereof. In another embodiment, the heat transfer fluid may be a heat transfer solvent in which the ammonium carbamate 122 is soluble and forms a solution. The heat transfer solvent is generally an inert polar fluid to which the ammonium carbamate is non-reactive. Examples of heat transfer solvents may include, but are not limited to, ethylene glycol (EG), propylene glycol (PG), and any other suitable polar fluid or combination thereof.

In embodiments in which the ammonium carbamate 122 is dissolved or suspended in a heat transfer fluid, the ammonium carbamate heat exchanger 120 may further comprise a circulating mechanism 129 that mixes and circulates the ammonium carbamate 122 solution or suspension throughout the ammonium carbamate heat exchanger 120 and ensures the maximum amount of contact between the ammonium carbamate 122 and the coils 125 and/or other thermally conductive structures such as fins or plates. The circulating mechanism 129 may comprise, for example, mechanical stirrers with paddles, fans or other agitation mechanisms, a magnetic stir plate and stir bar, or a circulation pump. In another embodiment, the thermal management system 100 may further comprise an ammonium carbamate reservoir and a mechanism by which additional ammonium carbamate 122 may be added (not shown) to the ammonium carbamate heat exchanger 120 to replenish ammonium carbamate levels if desired or required, depending upon the system size and operational requirements.

The ammonium carbamate heat exchanger 120 is further coupled to a pressure controller 130 that is configured to control the overhead pressure throughout the thermal management system 100. The pressure controller 130 may comprise one or more pressure sensors (not separately labeled) in a variety of locations that monitor the overhead pressure in the ammonium carbamate heat exchanger 120. As the ammonium carbamate 122 decomposes into ammonia and carbon dioxide gas, the overhead pressure within the ammonium carbamate heat exchanger 120 fluctuates. The pressure controller 130 is further coupled to a valve 131 and a vacuum source 140 that may be used to remove the exhaust 150, which consists of the decomposition gases, carbon dioxide and ammonia. The valve 131 may comprise, for example, an electromechanically operated solenoid valve. In one embodiment, the vacuum source 140 may comprise a vacuum pump such as a diaphragm pump. In another embodiment, where the thermal management system 100 is employed in a low atmospheric pressure environment, the vacuum source 140 may comprise the pressure differential between the (high pressure) interior of the thermal management system 100 and the (low pressure) exterior atmosphere. Low pressure environments include those in which the pressure outside the thermal management system 100 is less than the pressure inside the thermal management system 100, which includes airborne and space platforms. The pressure controller 130 controls the pressure within the ammonium carbamate heat exchanger 120 by opening and closing the valve 131 and regulating access to and/or operation of the vacuum source 140 to remove the decomposition gases, thereby increasing or decreasing the overhead pressure. Alteration of the pressure may be used to control the rate of decomposition of the ammonium carbamate 122, thus controlling the rate and amount of heat transfer from the thermal load source 102.

The tubing or couplings between the thermal load 102, the flow controller 105, the control unit 110, the ammonium carbamate heat exchanger 120, and/or the vacuum source 140 may comprise materials that are inert to ammonia, such as aluminum or a high temperature polymer or polymer blend. In addition, the tubing or coupling linking the ammonium carbamate heat exchanger 120 to the valve 131 and/or the vacuum source 140 may optionally comprise a heating element 127 to prevent the carbon dioxide and ammonia gas from condensing and/or reforming ammonium carbamate, which may cause blockage. In the embodiment depicted in FIG. 1, the heating element 127 is shown only on the linkage between the ammonium carbamate heat exchanger 120 to the valve 131. The heating element 127 may comprise, for example, heating coils, tapes, and jackets, and any other suitable heating element known in the art.

Additional temperature sensors may be incorporated throughout the thermal management system 100 as needed to monitor and maintain the temperature above the ammonium carbamate condensation temperature at the operational pressures. Additional heating elements similar to heating element 127 depicted in FIG. 1 may be needed on other exhaust elements such as the linkages between the vacuum source 140 and the exhaust 150 to prevent reformation and condensation of ammonium carbamate within those conduits, as would be understood by those skilled in the art.

In one embodiment of the thermal management system 100 depicted in FIG. 1, the ammonium carbamate 122 may be treated as an expendable material, and the exhaust 150 may be removed from thermal management system 100 via a vent 170. The exhaust 150 may be released directly into the atmosphere or stored for later disposal. In situations in which the thermal management system 100 is employed in a low atmospheric pressure environment, the pressure differential between the (high pressure) interior of the thermal management system 100 and the (low pressure) exterior atmosphere may be used as the vacuum source 140 to regulate the overhead pressure of the ammonium carbamate heat exchanger 120. In an alternative embodiment, the exhaust 150 may be vented into a storage container, chamber, or vessel containing a reservoir fluid such as alcohol or glycol in which the ammonia gas is solvent. Exhaust 150 may be added to the reservoir fluid until saturation is reached, at which point ammonium carbamate begins precipitating out of solution. Once cooled, this precipitate may be introduced back into the reservoir of ammonium carbamate to be fed into the ammonium carbamate heat exchanger 120.

In general, when ammonium carbamate is utilized as an expendable material, the resulting ammonia and carbon dioxide gases may serve as the heat rejection media. When functioning in this mode, the ammonium carbamate-based systems according to the present invention offer distinct advantages over traditional thermal batteries such as those based on paraffin waxes. One clear advantage is the instantaneous response of the system. Because there is no requirement to regenerate the ammonium carbamate, the thermal management system may provide immediate turn-on and turn-off response; thus, on-demand thermal loads are particularly benefited by utilization of the presently disclosed ammonium carbamate-based thermal management systems and methods.

The second clear advantage of utilizing ammonium carbamate in an expendable operational mode is that the overall system may be scaled up to manage larger thermal loads. While the system generally requires certain fixed components such as the heat exchanger and devices to govern the overhead system pressure and the rejection of the product ammonia and carbon dioxide gases, the ammonium carbamate may be stored in specially-designed, lightweight containers. In these containers, the majority of the weight and volume are the ammonium carbamate. That is, as more of these storage units are utilized (i.e. the size of the thermal load to be managed becomes larger), the fraction of the overall system comprised of actual heat absorbing material (i.e. ammonium carbamate) becomes greater, compared with the balance of the system. Hence, for larger systems, the system level gravimetric and volumetric power ratings are enhanced. In contrast, traditional thermal batteries based on paraffin waxes and similar materials provide no advantage in system scaling. The makeup of the thermal batteries in terms of phase change material, heat spreaders, plumbing components, and housings are fixed. Increasing the thermal storage capacity of the system is accomplished by increasing the number of thermal storage batteries in proportion to the required load, which significantly increases the total weight of the system.

This ability to scale the size of the system to the anticipated load confers additional advantages on the presently disclosed ammonium carbamate-based thermal management systems. Specifically, for mobile applications in ground-, sea-, or air-transported systems, the amount of ammonium carbamate required for a particular application may easily be adjusted as the need varies. For example, conventional thermal management systems such as thermal batteries require installation of a system capable of handling the maximum possible thermal loads. In such systems, there is no simple method to adjust the system size as needed, which is of particular concern for weight- and/or volume-constrained environments such as those encountered in aircraft. In contrast, an ammonium carbamate-based thermal management system requires only the amount of ammonium carbamate required for a particular mission be carried onboard the aircraft, which eliminates unnecessary weight. Additional ammonium carbamate may also be carried in order to respond to unexpected conditions without the significant weight penalty associated with conventional systems.

Referring back to FIG. 1, in an alternative embodiment, the thermal management system 100 may comprise a redirection component 160 that redirects the exhaust 150 for use in a variety of other secondary applications and processes that utilize the ammonia and/or carbon dioxide for non-thermal management purposes. The redirection component 160 may comprise, for example, tubing and valves to redirect the exhaust 150 and pressure and temperature sensors and controllers to prevent clogging due to ammonium carbamate reformation (not separately labeled). Some applications may utilize the combination of ammonia and carbon dioxide gases, while others may require separation of the ammonia and carbon dioxide, which may require an additional separation component (not labeled) to separate the two gases. For example, if the expended ammonia is to be utilized for reduction of $NO_x$ emissions, ammonia gas is directed into the combustion or exhaust components of an engine. A person of ordinary skill in the art will appreciate that the specifics of the implementation of the redirection component 160 and the separation component will depend on the particular secondary application to which the exhaust 150 is being directed.

In a further embodiment, the thermal management system 100 comprises a secondary heat exchanger 180 that collects the exhaust 150 and reforms ammonium carbamate from the ammonia and carbon dioxide decomposition gases. Because formation of ammonium carbamate is exothermic, the secondary heat exchanger 180 is necessary to manage the heat produced. The regenerated ammonium carbamate may then be fed back into the ammonium carbamate heat exchanger 120. The secondary heat exchanger 180 may comprise any known suitable configuration known in the art including, but not limited to, tubing, fins, mechanical agitation mechanisms, and pumps. One embodiment of the secondary heat exchanger 180 may utilize the heat generated from the ammonium carbamate reformation as the heat source to maintain the requisite temperature for the heating element 127.

Figure 2:
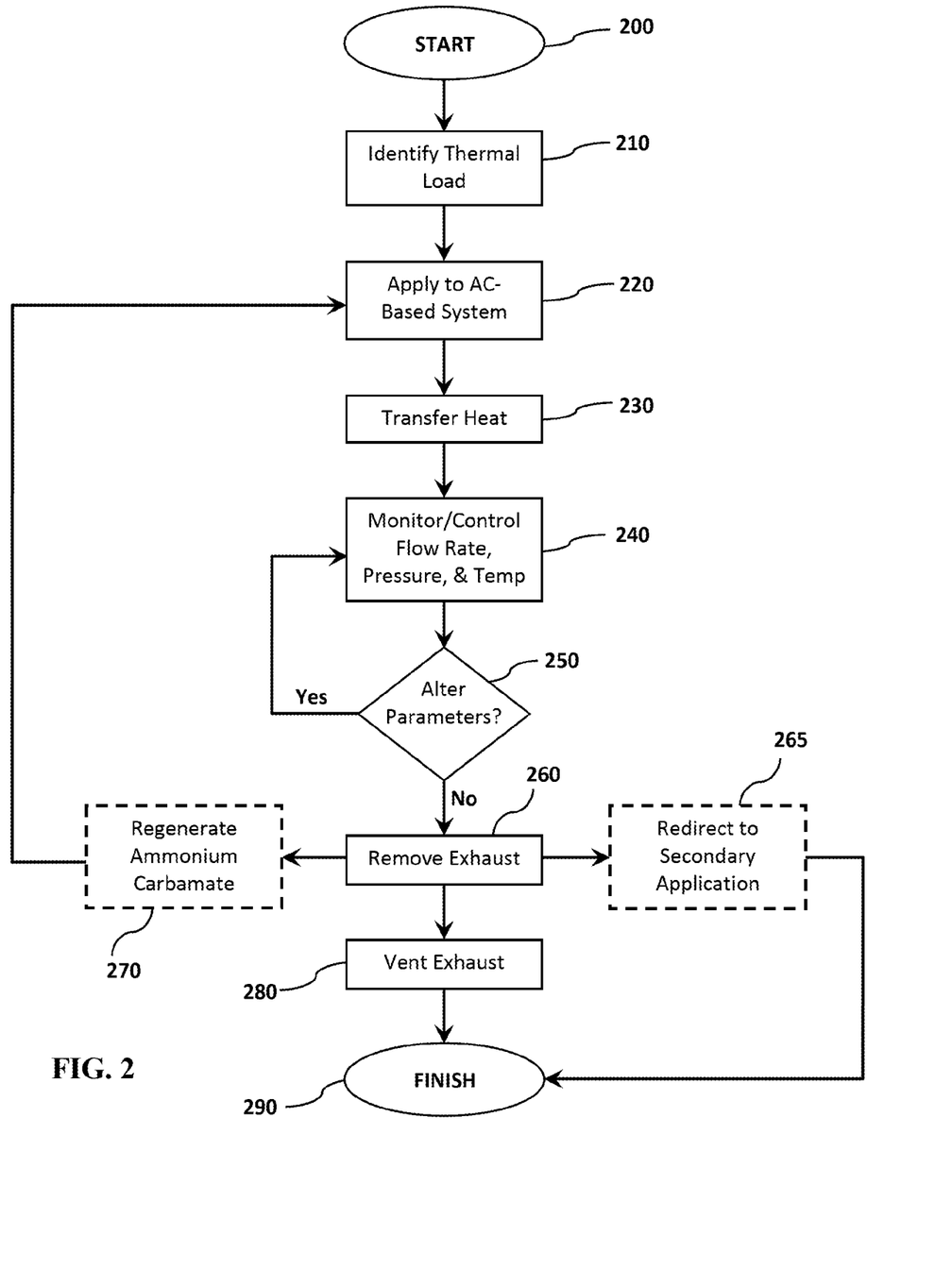
FIG. 2 is a flowchart of an exemplary embodiment of a method for managing a thermal load using an ammonium carbamate-based thermal management system.

FIG. 2 is a flowchart of an exemplary embodiment of a method for managing heat loads using an ammonium carbamate-based thermal management system. The method begins (Step 200) with the identification of a thermal load (Step 210), followed by application of the thermal load to an ammonium carbamate-based thermal management system (Step 220). The ammonium carbamate-based thermal management system may comprise a flow controller, a (primary) heat exchanger coupled to the flow controller, a vacuum source coupled to the heat exchanger, and a pressure controller coupled to the heat exchanger and the vacuum source. The flow controller is coupled to the thermal load, which may comprise a fluid such as a coolant fluid that transfers heat from a thermal load such as one or more electronic components, avionics systems, antenna, lasers and other optical systems, batteries, fuel cells, internal combustion engines, and other heat generating devices, components, subsystems and systems. In one embodiment, the thermal load is low quality or low-grade heat. The heat exchanger contains ammonium carbamate, and as heat is transferred from the thermal load to the ammonium carbamate in the heat exchanger (Step 230), the ammonium carbamate endothermically decomposes into ammonia gas and carbon dioxide gas.

Several heat exchanger configurations may be used to enhance the rate of heat transfer to ammonium carbamate during application of the thermal load (Step 220). In one embodiment of the method, the heat exchanger comprises a plurality of coils through which the coolant fluid from the heat load is circulated. Heat from the coolant fluid is transferred through the coils directly to the ammonium carbamate. In another embodiment of the method, the ammonium carbamate-based thermal management system may further comprise a thermally conductive material or matrix including, but not limited to, foams, fins, plates, pipes, and/or other thermally conductive structures having a suitable geometry. These thermally conductive structures may comprise a thermally conductive metal such as carbon, aluminum, or another suitable metal or combination, alloy, or composite thereof. Heat from the coolant fluid is transferred to the thermally conductive structures, which in turn transfer the heat to the ammonium carbamate. These thermally conductive structures provide for better surface contact with the ammonium carbamate, thereby increasing the amount of heat transfer.

In a further embodiment of the method, the ammonium carbamate contained in the ammonium carbamate-based thermal management system may comprise one or more non-aqueous heat transfer fluids. In one embodiment, the ammonium carbamate may be maintained within the heat exchanger such that it is physically isolated from the heat transfer fluid. In another embodiment, the ammonium carbamate may be dissolved and/or suspended in the heat transfer fluid. If the heat transfer fluid is one in which the ammonium carbamate is insoluble (a non-solvent heat transfer fluid), the ammonium carbamate forms a suspension. Examples of non-solvent heat transfer fluids may include, but are not limited to, xylene, triglyme, tetraglyme, high boiling petroleum products, and/or any other suitable liquid or combination thereof. Suspension of the ammonium carbamate in the non-solvent heat transfer liquid likely provides improved thermal contact between the thermal load and the ammonium carbamate, thereby enhancing heat transfer and reducing the effect of thermal resistances encountered at the contact surfaces. As compared to paraffin waxes and other thermal storage/transfer media such as foams, non-solvent thermal transfer fluids convey more heat per time to the ammonium carbamate. In addition, non-solvent heat transfer fluids provide for transport of the ammonium carbamate suspension through piping or other structures within the thermal management system. Ammonium carbamate suspensions may be generated on-site through a grinding process, or the suspension may be created off-site and then transported and stored in suitably sealed containers. If desired, solid ammonium carbamate may easily be recovered from these suspensions through a filtering process.

If the heat transfer fluid is one in which the ammonium carbamate exhibits solubility (a heat transfer solvent), the ammonium carbamate dissolves in the fluid to form a solution. Examples of heat transfer solvents may include, but are not limited to, ethylene glycol (EG), propylene glycol (PG), and any other suitable polar fluid or combination thereof. Heat transfer solvents offer all of the previously described advantages of the non-solvent heat transfer fluids: intimate contact with the ammonium carbamate, avoidance of thermal contact interfaces associated with foam or other structures, and higher rate of heat transfer arising from the mass transfer associated with a thermal fluid. In addition, heat transfer solvents produce dramatically increased rates of decomposition for the ammonium carbamate, leading to higher gravimetric and volumetric system power ratings than may be achieved with foams, fins, and/or non-solvent heat transfer fluids.

Figure 3:
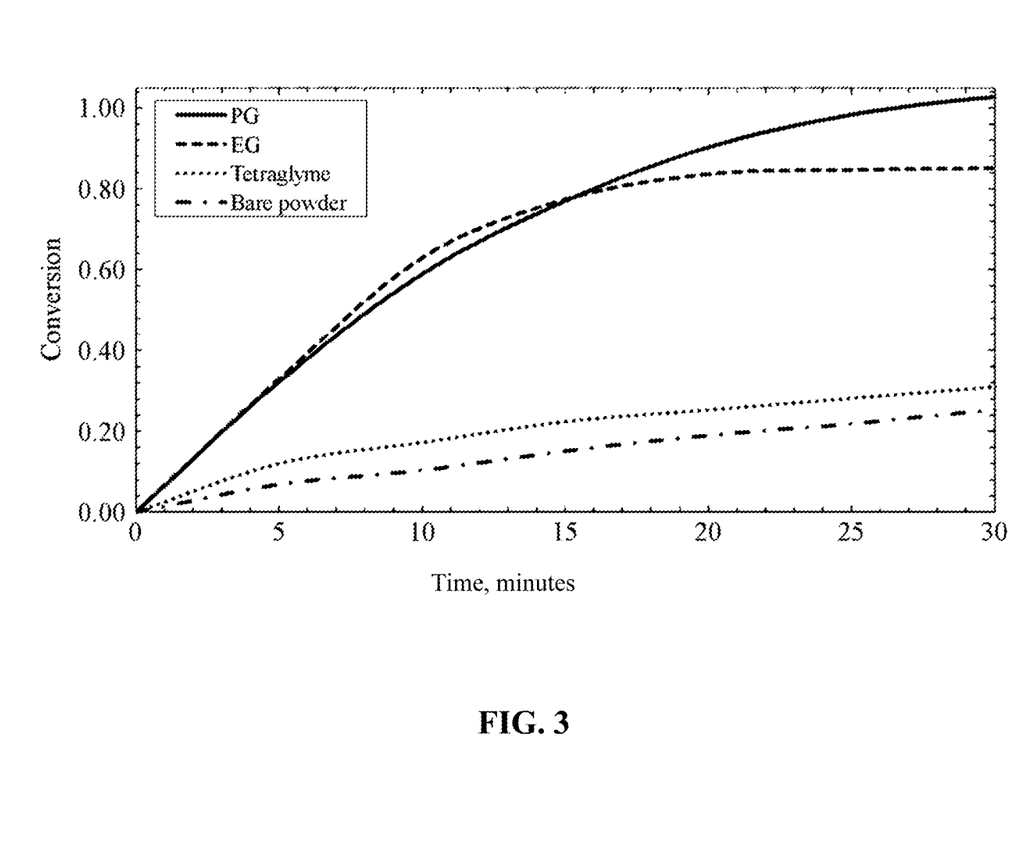
FIG. 3 is a graph depicting the ammonium carbamate conversion fraction as a function of time for bare ammonium carbamate powder and ammonium carbamate suspended or dissolved in propylene glycol, ethylene glycol, and tetraglyme.

As shown in FIG. 3, use of a non-solvent heat transfer fluid slightly enhances the ammonium carbamate decomposition reaction. Ammonium carbamate suspended in tetraglyme (• • • •) shows some improvement in the rate and amount of conversion as compared to bare ammonium carbamate powder (▄ ■). Dissolution of the ammonium carbamate in heat transfer solvents PG (▄▄) and EG (▄ ▄) results in significantly higher rates of decomposition as compared to the bare ammonium carbamate powder and tetraglyme. The enhanced decomposition rate is likely due to the greater rate of heat transfer as a result of more intimate contact of the ammonium carbamate in solution, which further decreases the interfacial heat transfer barrier between the liquid and solid. Furthermore, a heat transfer solvent may mitigate clogging problems intrinsic to non-solvent heat transfer fluids. Solid ammonium carbamate may fall out of suspension and accumulate in and/or block transfer lines, and the use of a heat transfer solvent may dissolve blockages to provide more reliable system operation.

Figure 4:
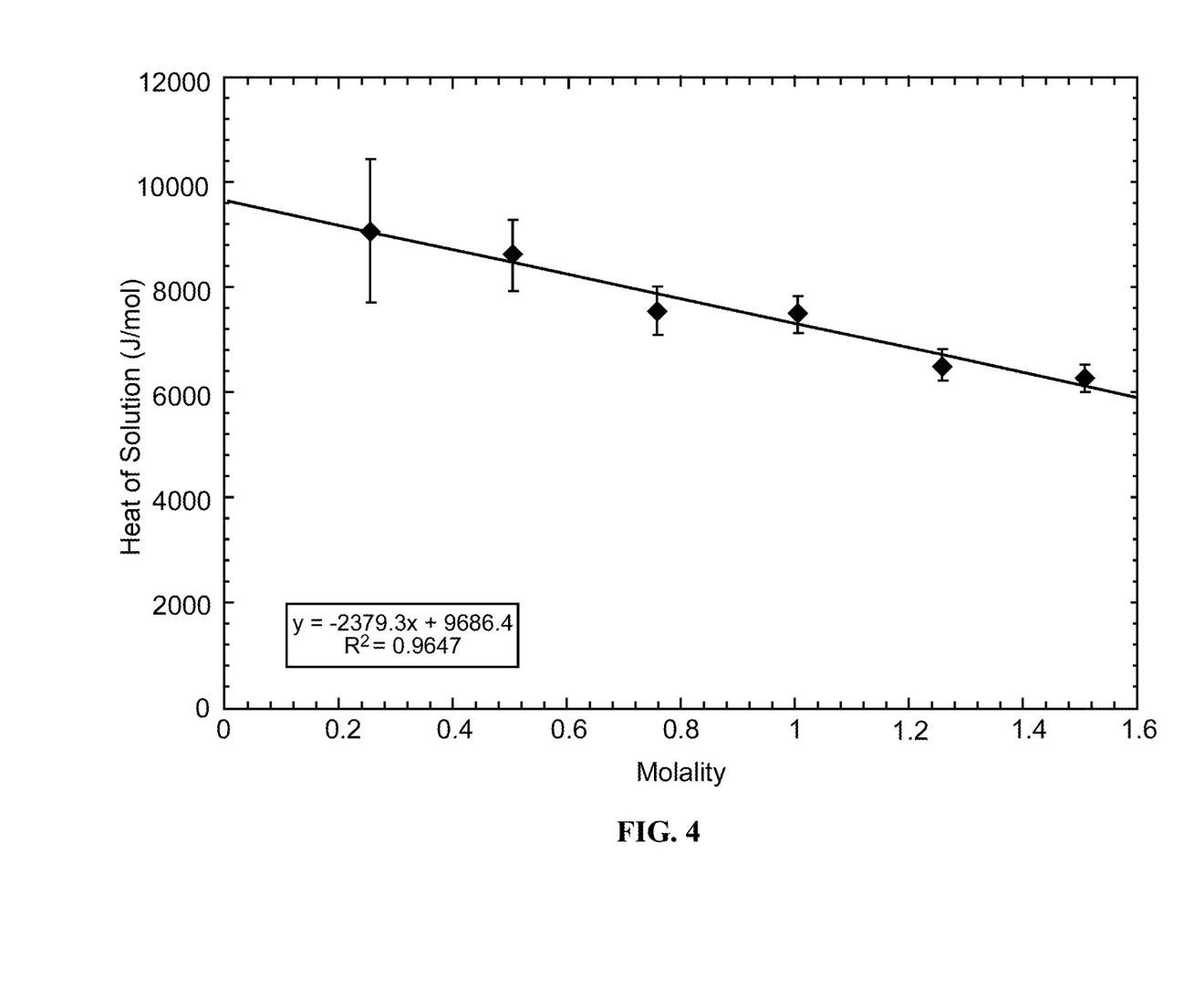
FIG. 4 is a graph depicting the heat of solution of ammonium carbamate in ethylene glycol as a function of molality at room temperature.
Figure 5:
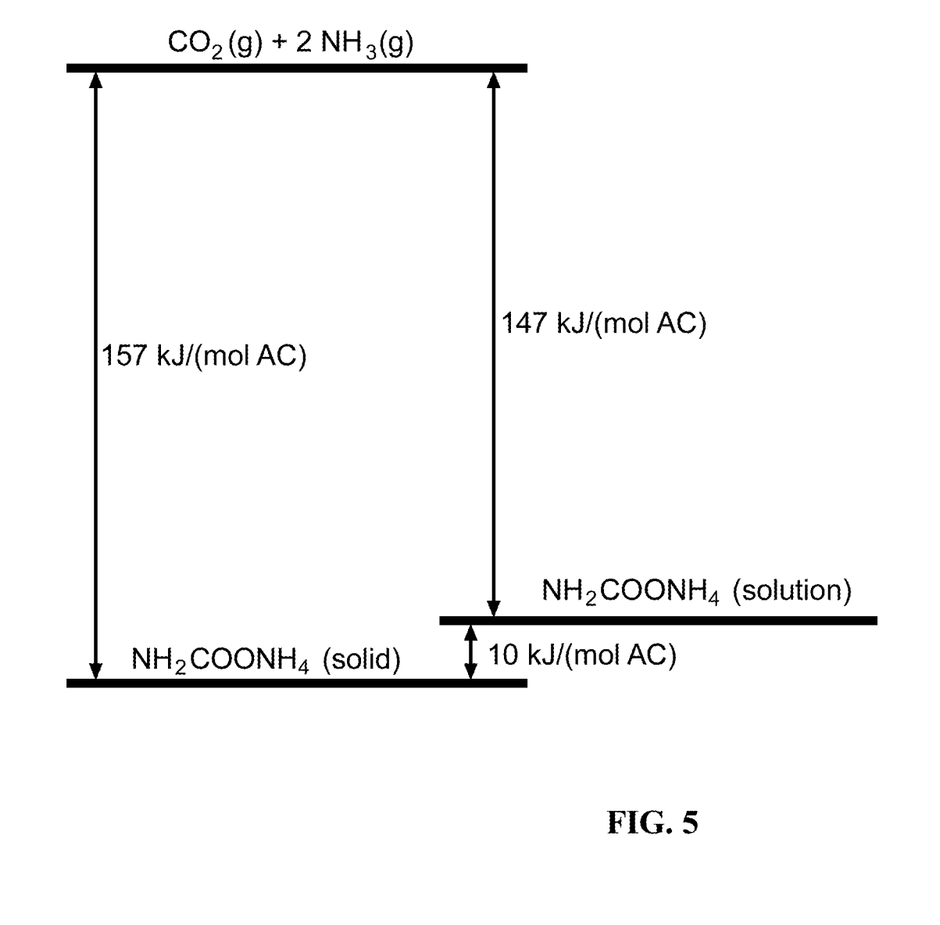
FIG. 5 is a Born-Haber cycle for the formation and decomposition of ammonium carbamate.

In a further embodiment of the method, the endothermic dissolution of ammonium carbamate in a heat transfer solvent may be used to provide a separate cooling function distinct from the cooling provided by the decomposition of the ammonium carbamate into ammonia gas and carbon dioxide gas. Dissolution of ammonium carbamate in a solvent lowers the temperature of the solution below that of the surrounding environment, and heat transfer solvents offer the additional advantage of utilizing this endothermic heat of solution as an additional cooling operation. FIG. 4 is a plot (with error bars) of the heat of solution of ammonium carbamate in ethylene glycol as a function of molality. The heat of solution at infinite dilution was determined to be about 9.7 kJ/mol. FIG. 5 is the Born-Haber cycle for ammonium carbamate illustrating the heat of solution, as well as the heat of decomposition for both solid ammonium carbamate and ammonium carbamate in solution.

Referring back to FIG. 2, a variety of parameters including, but not limited to, the coolant fluid flow rate from the thermal load, the temperature of the thermal load, the temperature within the heat exchanger, and/or the overhead pressure within the ammonium carbamate-based thermal management system are monitored and controlled using one or more controllers (Step 240). The rate and amount of heat transfer is evaluated, and one or more parameters such as the fluid flow rate, temperature(s), and/or pressure may be altered to achieve the desired amount of decomposition and heat absorption (Step 250). Where the amount of heat transfer is above or below a desired amount or range, the fluid flow rate, temperature, and/or pressure within the ammonium carbamate-based thermal management system may be increased or decreased (Step 240) using one or more controllers to achieve the desired amount of ammonium carbamate decomposition, thus altering the amount of heat absorbed by the ammonium carbamate-based thermal management system.

In one embodiment, the fluid flow rate from the thermal load and the temperature are monitored and controlled by the flow controller, which may comprise a control unit and a circulation pump. The control unit may further comprise one or more temperature, pressure, and flow rate sensors. In another embodiment, the overhead pressure in the ammonium carbamate-based thermal management system may be controlled by the pressure controller, which comprises a pressure sensor and valve and is coupled to the heat exchanger and a vacuum source. In a further embodiment, a temperature difference between the thermal load and the ammonium heat exchanger may be regulated to control the ammonium carbamate-based thermal management system operation. All of these control mechanisms and parameters may be operated and utilized independently or in combination with one another to provide advantages to specific implementations and specific operational condition. This flexibility contrasts with conventional paraffin wax-based thermal management systems, which are typically designed for narrow operational temperature ranges.

Alteration of the fluid flow rate and system temperature and/or overhead pressure allows tight control over the amount and rate of heat transfer. In general, higher temperatures and lower overhead pressure increase the rate at which the ammonium carbamate decomposes. This flexibility provides additional advantages not evident with many other conventional thermal management materials and systems that rely on large surface areas and exceedingly large fluid flow rates to reject low quality heat. Conventional phase change thermal management materials such as paraffin waxes provide limited means to control the rate of heat absorption. For example, paraffin wax is often incorporated into thermal batteries, and heat transfer into and out of the thermal battery structure is accomplished by means of heat transfer fins bonded to piping. A heat transfer medium flows through the piping, and heat is conducted from the fluid to the fins, causing the paraffin wax in contact with the fins to melt. The rate of heat absorption is governed by the interplay between the temperature and flow of the fluid in the pipe; the heat transfer to the pipe; the heat transfer by conduction from the pipe to the fins; the heat transfer from the fins to the paraffin wax in contact with the fin; and the heat transfer to the bulk, unmelted wax. It is the last step—the heat transfer to unmelted paraffin wax—that is especially difficult to control.

Figure 6:
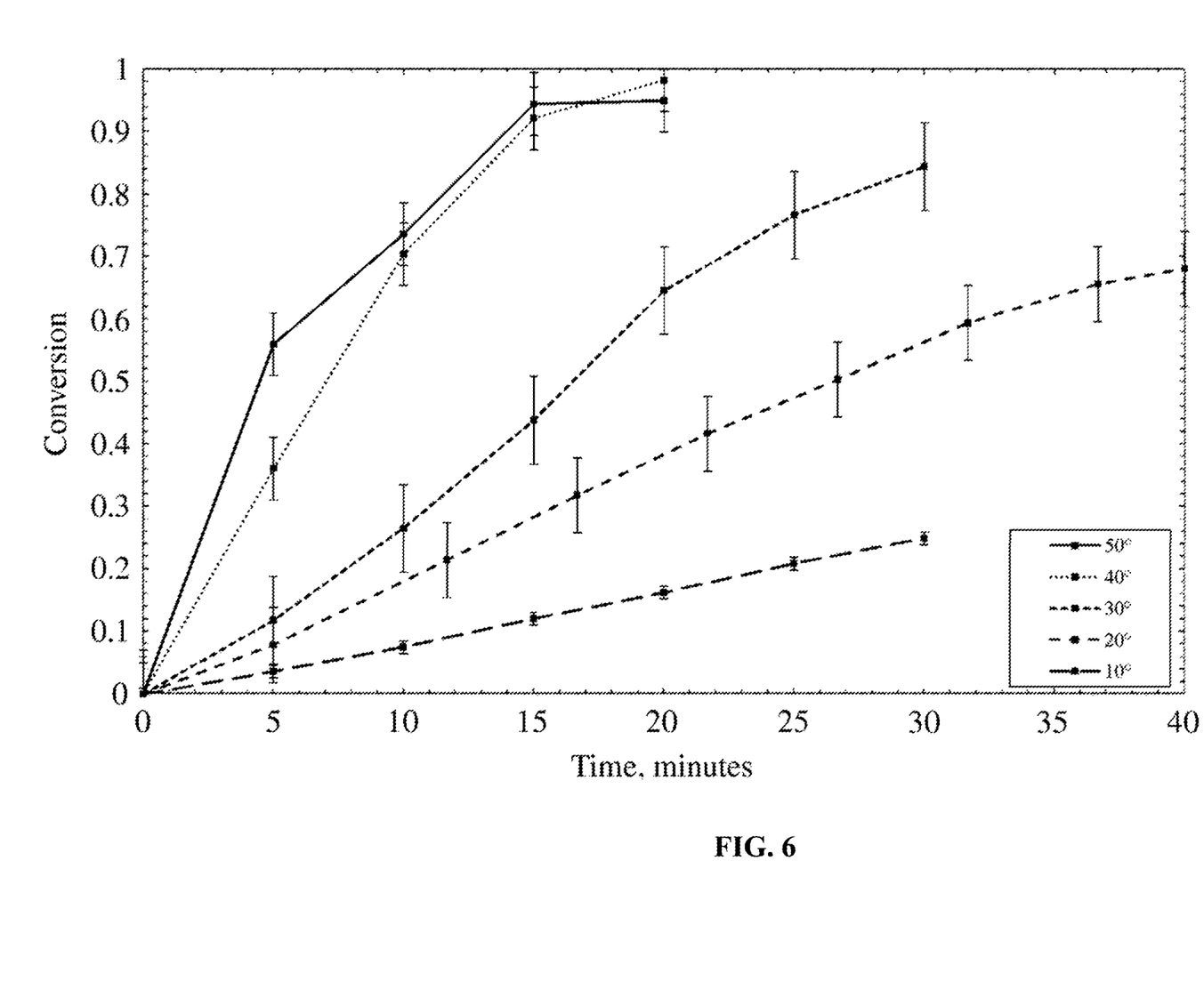
FIG. 6 is a graphical comparison of the conversion fraction as a function of time for ammonium carbamate in ethylene glycol at five different temperatures ranging from 10° C. to 50° C.

In contrast, the rate of heat absorption in an ammonium carbamate-based thermal management system, particularly as implemented with a heat transfer solvent, may be easily controlled via the rate of fluid flow and the system temperature. While temperature has a small or modest effect on the rate of heat absorption for paraffin waxes, increased temperatures for the heat transfer solvent dramatically increase the rate of decomposition of ammonium carbamate. FIG. 6 is a plot (with error bars) illustrating the conversion of ammonium carbamate in ethylene glycol at 10° C. (▬▬ ▬▬), 20° C. (▬ ▬), 30° C. (■ ■ ■ ■ ■) 40° C. (•••••) and 50° C. (▬▬▬) (the overhead pressure was less than 1 torr and the reaction vessel was loaded with a quantity of ammonium carbamate approximately twice its solubility limit in ethylene glycol). As shown in FIG. 6, the conversion rate and amount increases dramatically with each ten degree increase from 10° C. to 40° C. Some mass transfer or thermal transfer limitations may be evident at the highest temperature in this plot. Thus, in systems in which a thermal load is manifested by an increased temperature of the thermal load, the present innovation intrinsically responds to the increase in said load in a way that is clearly advantageous when compared with systems based on paraffin waxes and similar materials.

Figure 7:
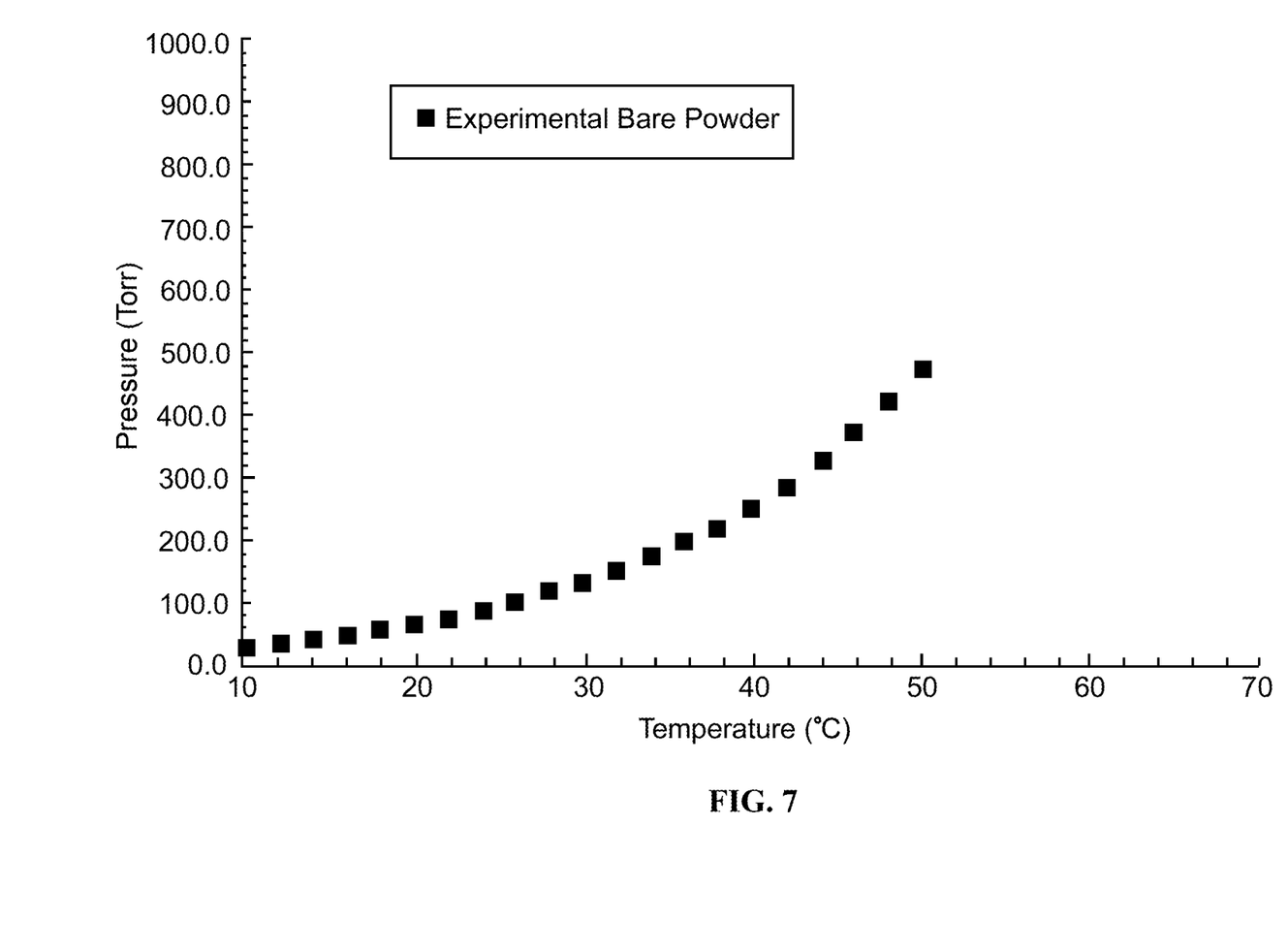
FIG. 7 is a graph of the experimental decomposition pressure of ammonium carbamate powder as a function of temperature.

Furthermore, unlike systems based on paraffin waxes and similar materials, overhead pressure within the ammonium carbamate-based thermal management system may be used to govern the rate of decomposition of ammonium carbamate, thereby achieving additional control of the rate and amount of heat absorption. The products of ammonium carbamate decomposition are entirely gaseous, so the rate of decomposition is strongly dependent on the overhead pressure. The equilibrium decomposition pressure as a function of temperature for bare ammonium carbamate powder is shown in FIG. 7. The experimental data is in good agreement with the equilibrium decomposition temperature and pressure of about 60° C. at atmospheric pressure for ammonium carbamate found in the literature (data not shown). A slurry of ammonium carbamate in ethylene glycol exhibited similar decomposition properties to those of bare ammonium carbamate powder (data not shown).

Figure 8:
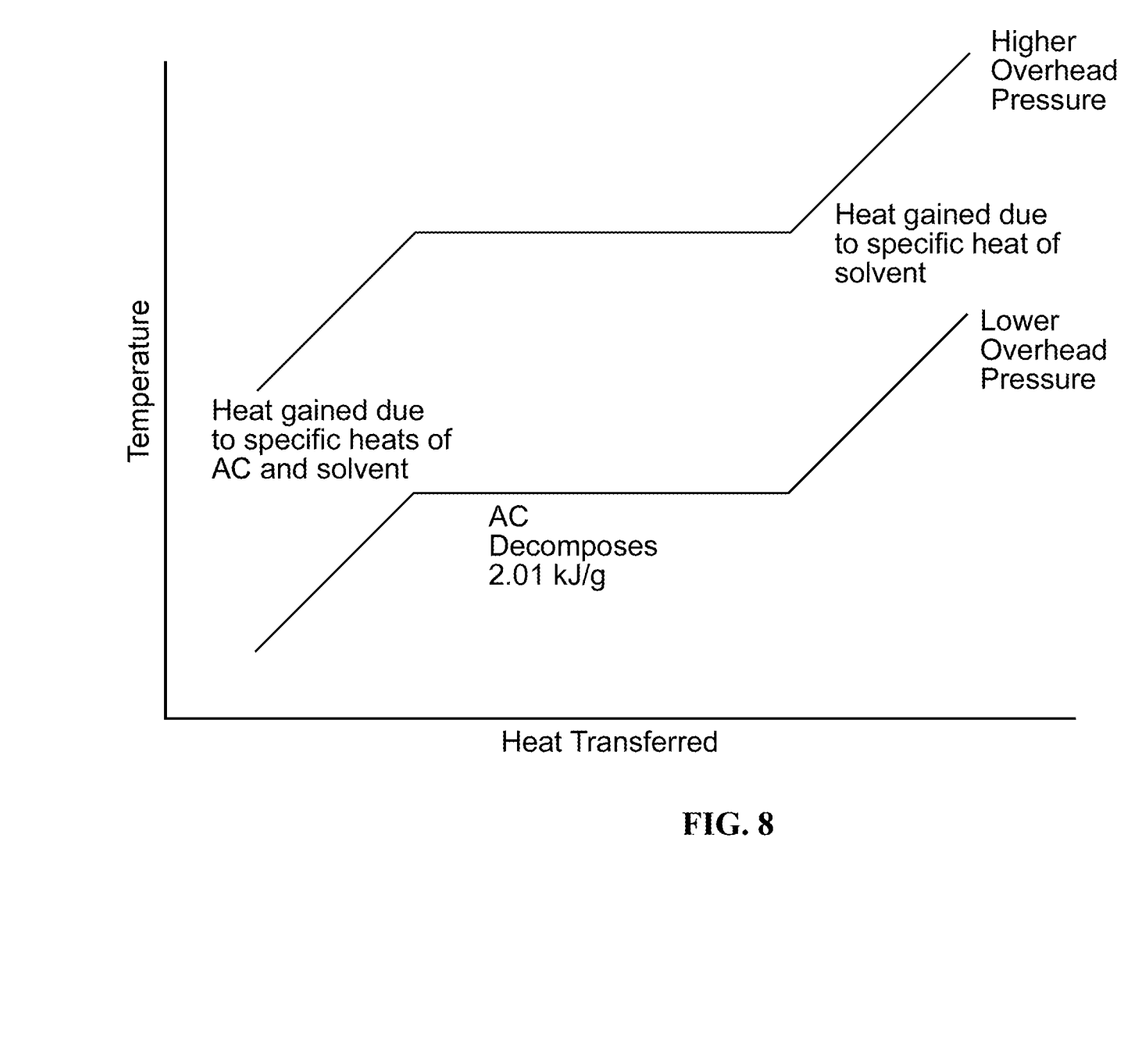
FIG. 8 is a graphical depiction of the heat absorption exhibited by ammonium carbamate at two different overhead pressures.

FIG. 8 is an illustrative schematic graph for the decomposition of ammonium carbamate as heat is absorbed at two different overhead pressures. Pressures lower than atmospheric pressure remove the gases produced, thus increasing the forward rate of reaction for the decomposition of ammonium carbamate. Pressures less than one torr result in very high decomposition rates, but higher pressures (200-400 torr) are still effective as shown in Table 2. Thus, provision of a mechanism for controlling the removal of ammonia and carbon dioxide gases, and in the process controlling the overall pressure of the system, serve as a direct-feedback mechanism for controlling the decomposition rate of ammonium carbamate, and hence the rate of heat absorption.

Referring back to FIG. 2, the exhaust comprising the decomposition gases (ammonia and carbon dioxide) is removed from the ammonium carbamate-based thermal management system (Step 260). In one embodiment, the ammonium carbamate is treated as an expendable material, and the exhaust is vented (Step 280), followed by conclusion of the method (Step 290). The vented exhaust may be stored for later disposal, or it may be ejected into the atmosphere. In one embodiment, the exhaust is vented into a tank or vessel comprising a reservoir fluid such as alcohol or glycol in which the ammonia gas is soluble to facilitate reformation of ammonium carbamate and heat rejection as the ammonium carbamate is reformed. This embodiment may be particularly useful for reutilization or disposal of ammonium carbamate in the event that direct venting to the atmosphere is undesirable or impractical.

In an alternative embodiment of the method, the exhaust may be regenerated into ammonium carbamate (Step 270). In the regenerative operational mode, the ammonia and carbon dioxide gases produced by decomposition of the ammonium carbamate are recombined in a subsystem, remote from the heat absorption subsystem, to reform ammonium carbamate. Since the re-forming of the ammonium carbamate is an exothermic (heat evolving) process, provision should be made for rejection of the thermal load such as through use of a heat exchanger, which may be accomplished in a variety of methods evident to those skilled in the art. The regenerated ammonium carbamate is then deposited into the ammonium carbamate-based thermal management system for reuse, and the method resumes with application of the thermal load to the ammonium carbamate-based thermal management system (Step 220).

In a further embodiment of the method, the exhaust may be redirected to a secondary application or process that utilizes one or both of the decomposition gases (Step 265), and the method concludes (Step 290). As described above, some secondary applications may utilize the combination of ammonia and carbon dioxide gases, while others may require separation of the ammonia and carbon dioxide gases. These secondary applications may include, but are not limited to, an ammonia-powered engine or an ammonia fuel cell, as well as reduction of $NO_x$ gases produced by combustion and industrial processes.

The following examples and methods are presented as illustrative of the present invention or methods of carrying out the invention, and are not restrictive or limiting of the scope of the invention in any manner.

Example 1: Evaluation of Heat Transfer Fluids

Tetraglyme (b.p. 275° C.), ethylene glycol (EG; b.p. 197° C.), and propylene glycol (PG; b.p. 187° C.) are evaluated by measuring the decomposition of ammonium carbamate as a bare powder and in each liquid as a function of temperature under vacuum ($1 \times 10^{-5}$ torr) at 30° C. Prior to use, all fluids are dried over 3 Å molecular sieves to remove any water. Decomposition experiments are conducted using a 300 mL high vacuum Schlenk tube with 18.5 g of ammonium carbamate powder and 50 mL of each heat transfer fluid. All inert gases in the tubes are removed using a vacuum line. Prior to the experiment, the Schlenk tubes are immersed in a temperature controlled water bath for a minimum of 30 minutes to ensure thermal equilibrium. Decomposition experiments are carried out by exposing the reaction vessels to high vacuum in five minute intervals and weighing the flask between each interval to find the amount of ammonium carbamate lost.

The conversion versus time profiles for the four test cases at 30° C. are shown in FIG. 3 (bare powder ▬ ■; tetraglyme• • • •; PG ▬▬; EG▬ ▬), with conversion being defined as: (initial mass-final mass)/initial mass. PG shows a conversion slightly greater than one due to entrainment of a small amount (1 g) of PG in the decomposition gases exiting the tube caused by rapid decomposition. The tetraglyme-ammonium carbamate suspension demonstrated a slight increase in the rate of decomposition, while dissolution of ammonium carbamate in EG and PG demonstrated significantly higher rates of decomposition.

Example 2: Fabrication and Testing of an Ammonium Carbamate-Based Thermal Management System An ammonium carbamate-based thermal management system is constructed (see FIG. 1). The heat exchanger in the small-scale test system is constructed based on a 500 mL reaction vessel. The fluid in the heat exchanger is stirred using a stir plate and a magnetic stir bar. A laboratory water circulator linked to a series of coils serves as a simulated thermal load for the system. The temperature of the reactor is controlled using the laboratory circulator, and the system is brought to each test temperature before addition of the ammonium carbamate. The pressure of the reaction vessel is controlled using a diaphragm vacuum pump, which is controlled by a pressure controller using a solenoid valve to maintain system pressure.

Multiple combinations of temperature, pressure, and heat transfer solvents are tested using the ammonium carbamate-based thermal management system. The experimental procedure at each temperature is as follows. Heat transfer fluid (650 mL) is added to the reactor vessel and allowed to come to steady state with the recirculator temperature before the test is started so that the inlet, outlet, and bulk temperatures are substantially the same temperature. After the ammonium carbamate is added to the reactor vessel, the reactor vessel is quickly closed and sealed, and the pressure controller activates the vacuum pump to set the appropriate pressure. The system temperatures are logged using a data logger in one second increments. The pressure measurements are manually recorded at appropriate intervals. Each test is stopped once steady state is reached. If the pressure controller is set to a pressure higher than 0 torr, the pressure is incrementally lowered to cause additional decomposition once steady state is reached.

An energy balance is conducted over the reactor by measuring the circulating fluid (water) flow rate, inlet temperature, and outlet temperature. The amount of heat rejected may then be directly correlated to the thermal power rejected by the system and could also be integrated with respect to time to find the total amount of energy consumed by the decomposition of the ammonium carbamate. This amount of energy is then compared with the energy calculated based on the heat of reaction from the mass of ammonium carbamate added. Table 2 contains a summary of the experimental conditions and data collected using the ammonium carbamate (AC)-based thermal management (TM) system. In Table 2, "Decomp." is the calculated amount of energy needed to decompose the AC based on a decomposition enthalpy of 2010 kJ/kg. "$C_p$" is the amount of energy required to heat the AC up to the reactor temperature, while "Integration" is the amount of energy rejected to the recirculator based on the energy balance. "Difference" is the percent difference between the amount of energy required from the decomposition and the sum of $C_p$ and Integration. "Peak Power" is the highest thermal power that was achieved for each particular set of experimental conditions. The solvent marked "PG*" indicates that the PG was reused, as it has been demonstrated that the PG may be reutilized with no evident degradation in performance.

TABLE 2

Experimental Data AC-Based TM System

| Temp (° C.) | Solvent | AC (g) | Pressure (torr) | Decomp. (kJ) | $C_p$ (kJ) | Integration (kJ) | Difference (%) | Peak Power (W) |
|---|---|---|---|---|---|---|---|---|
| 30 | PG | 105.2 | 0 | 211.53 | 1.88 | 161.32 | −24.4 | 39.3 |
| 30 | EG | 104.0 | 0 | 208.95 | 1.86 | 107.99 | −48.8 | 52.2 |
| 45 | PG | 104.6 | 0 | 210.31 | 6.01 | 255.98 | 18.3 | 138 |
| 45 | EG | 104.3 | 0 | 209.59 | 5.92 | 225.05 | 4.4 | 145.5 |
| 50 | PG | 102.4 | 0 | 205.73 | 7.40 | 190.67 | −10.5 | 144.7 |
| 55 | PG | 101.4 | 0 | 203.76 | 6.96 | 206.31 | −2.1 | 203.8 |
| 60 | PG | 100.9 | 0 | 202.89 | 7.05 | 186.82 | −11.0 | 223.9 |
| 60 | PG | 102.6 | 200, 0 | 206.27 | 7.18 | 195.37 | −8.5 | 223.3, 42.0 |
| 60 | EG | 102.0 | 0 | 204.99 | 6.58 | 206.64 | −2.3 | 241.5 |
| 60 | EG | 101.7 | 200, 0 | 204.34 | 6.30 | 219.50 | 4.2 | 238.8, 74.2 |
| 60 | PG | 102.2 | 400, 200, 0 | 205.39 | 7.38 | 236.12 | 11.0 | 174.2, 101.3, 44.0 |
| 60 | EG | 103.0 | 400, 200, 0 | 207.02 | 7.41 | 208.73 | −2.7 | 159.4, 1341, 87.7 |
| 60 | PG | 204.4 | 0 | 410.75 | 14.77 | 530.85 | 24.8 | 319.2 |
| 60 | PG* | 100.3 | 0 | 204.53 | 7.16 | 248.90 | 19.3 | 266.9 |
| 60 | PG* | 102.3 | 0 | 205.59 | 7.27 | 256.73 | 20.6 | 269.8 |

As seen in Table 2, increasing the temperature dramatically increases the peak power output, and this high thermal power rating was maintained even under increasingly higher pressures. The ability to maintain rapid decomposition under higher pressures is particularly favorable for an ammonium carbamate-based thermal management system as the decomposition creates ammonia and carbon dioxide gas, which may keep the system pressure higher than the set pressure. In addition, EG and PG perform equally well, and PG is generally preferable due to the toxicity of EG. Finally, the addition of more ammonium carbamate increased the thermal power, indicating that additional ammonium carbamate may be added as needed throughout the cycle to achieve the desired heat transfer and to meet changing thermal management demands.

Although specific embodiments have been described in detail in the foregoing description and illustrated in the drawings, various other embodiments, changes, and modifications to the disclosed embodiment(s) will become apparent to those skilled in the art. All such other embodiments, changes, and modifications are intended to come within the spirit and scope of the appended claims.

What is claimed is:

1. An ammonium carbamate-based thermal management system comprising:
    a flow controller comprising a control unit, a coolant fluid for absorbing heat from a thermal load, a coolant fluid circulation pump, a flow valve, and at least one temperature sensor, wherein the coolant fluid circulation pump is fluidly coupled to the thermal load, and wherein the flow controller is configured to regulate a flow of the coolant fluid from the thermal load;
    a primary heat exchanger coupled to the flow controller, wherein the primary heat exchanger comprises ammonium carbamate and a non-aqueous heat transfer fluid that is non-reactive with the ammonium carbamate, wherein the primary heat exchanger is configured to transfer heat from the coolant fluid to the heat transfer fluid and the ammonium carbamate, and wherein the ammonium carbamate endothermically decomposes into ammonia gas and carbon dioxide gas upon the transfer of heat from the coolant fluid;
    a vacuum source coupled to the primary heat exchanger, wherein the vacuum source is configured to provide the primary heat exchanger with a pressure lower than atmospheric pressure; and
    a pressure controller coupled to the primary heat exchanger and to the vacuum source, wherein the pressure controller is configured to maintain pressures lower than atmospheric pressure in the primary heat exchanger to remove the ammonia gas and the carbon dioxide gas from the primary heat exchanger, thereby regulating an overhead pressure within the ammonium carbamate-based thermal management system.

2. The ammonium carbamate-based thermal management system of claim 1 wherein the vacuum source comprises a vacuum pump and a valve.

3. The ammonium carbamate-based thermal management system of claim 1 further comprising at least one heating element between the primary heat exchanger and the vacuum source, wherein the heating element is configured to prevent the ammonia gas and the carbon dioxide gas from combining to reform ammonium carbamate prior to removal from the ammonium carbamate-based thermal management system.

4. The ammonium carbamate-based thermal management system of claim 1 further comprising a storage chamber.

5. The ammonium carbamate-based thermal management system of claim 4 wherein the storage chamber further comprises a reservoir liquid in which at least one of the ammonia gas and the carbon dioxide gas are soluble.

6. The ammonium carbamate-based thermal management system of claim 1 further comprising a redirection component, wherein the redirection component is configured to direct the ammonia gas or the carbon dioxide gas from the vacuum source to at least one secondary application.

7. The ammonium carbamate-based thermal management system of claim 1 further comprising a secondary heat exchanger coupled to the vacuum source, wherein the secondary heat exchanger is configured to exothermically combine the ammonia gas and the carbon dioxide gas to form regenerated ammonium carbamate, and wherein the regenerated ammonium carbamate is transferred back into the primary heat exchanger.

8. The ammonium carbamate-based thermal management system of claim 1 wherein the primary heat exchanger further comprises a circulation mechanism.

9. The ammonium carbamate-based thermal management system of claim 1, wherein the heat transfer fluid comprises a non-solvent heat transfer fluid, whereby the ammonium carbamate forms a suspension in the non-solvent heat transfer fluid.

10. The ammonium carbamate-based thermal management system of claim 1, wherein the heat transfer fluid comprises a heat transfer solvent, whereby the ammonium carbamate forms a solution in the heat transfer solvent.

11. The ammonium carbamate-based thermal management system of claim 1, wherein the primary heat exchanger comprises a plurality of coils configured such that the coolant fluid flows through the plurality of coils, and wherein an exterior surface of the plurality of coils is in contact with the heat transfer fluid.

12. The ammonium carbamate-based thermal management system of claim 1, wherein the primary heat exchanger comprises a plurality of thermally conductive structures configured such that heat from the coolant fluid is transferred to the thermally conductive structures, and wherein an exterior surface of the thermally conductive structures is in contact with the heat transfer fluid.

13. The ammonium carbamate-based thermal management system of claim 1, wherein the thermal load is selected from the group consisting of an electronic component, an avionic system, an antenna, a laser, a battery, and a fuel cell.

14. An ammonium carbamate-based thermal management system comprising:
    a thermal load selected from the group consisting of an electronic component, an avionic system, an antenna, a laser, a battery, and a fuel cell;
    an ammonium carbamate-based heat exchanger comprising ammonium carbamate and a non-aqueous heat transfer fluid, wherein heat absorbed into the heat transfer fluid causes an endothermic decomposition of ammonium carbamate into ammonia gas and carbon dioxide gas;
    a circulation loop comprising a coolant fluid and a coolant fluid circulation pump, wherein the circulation loop is fluidly coupled to the thermal load and the ammonium carbamate-based heat exchanger, and wherein the coolant fluid absorbs heat away from the thermal load and transfers heat to the ammonium carbamate-based heat exchanger; and
    a control system comprising
    a pressure controller coupled to the ammonium carbamate-based heat exchanger, wherein the pressure controller regulates pressure within the ammonium carbamate-based heat exchanger at a level less than atmospheric pressure, and facilitates transfer of the ammonia gas and carbon dioxide gas formed by the endothermic decomposition of ammonium carbamate out of the ammonium carbamate-based heat exchanger;
    a flow valve in the circulation loop to regulate a flow of the coolant fluid; and
    at least one temperature sensor for sensing a temperature of the coolant fluid, wherein the control system is configured to control a rate of the endothermic decomposition of ammonium carbamate by controlling operation of the pressure controller, the flow valve, and/or the coolant fluid circulation pump.

* * * * *